United States Patent [19]
Montano

[11] 3,885,445
[45] May 27, 1975

[54] MASTER LINK ASSEMBLY

[75] Inventor: Joseph V. Montano, Hartford, Conn.

[73] Assignee: Dresser Industries, Inc., Dallas, Tex.

[22] Filed: Nov. 27, 1972

[21] Appl. No.: 309,831

[52] U.S. Cl. ............................... 74/250 R; 74/254
[51] Int. Cl. ........................................... F16g 13/02
[58] Field of Search ........................ 74/250 R, 254

[56] References Cited
UNITED STATES PATENTS

| | | | |
|---|---|---|---|
| 1,793,065 | 2/1931 | Da Costa | 74/254 |
| 2,118,736 | 5/1938 | Odom | 74/254 X |
| 2,713,276 | 7/1955 | Siverson | 74/254 UX |
| 2,775,156 | 12/1956 | Imse et al. | 74/254 X |

FOREIGN PATENTS OR APPLICATIONS

| | | | |
|---|---|---|---|
| 168,247 | 9/1921 | United Kingdom | 74/254 |

*Primary Examiner*—Leonard H. Gerin
*Attorney, Agent, or Firm*—Daniel Rubin

[57] ABSTRACT

A master link assembly for releasably coupling the opposing ends of a series of articulated links to form a chain wherein the opposing ends are defined by a pair of roller link assemblies each having a pair of opposing link plates with pitch holes extending between the opposing faces thereof and a pair of tubular bushings press fitted thereinto comprising first and second link plates each including a pair of pitch holes extending between the opposing faces thereof, a pair of connecting pins selectively configured for slidable insertion into a tubular bushing and for insertion into the pitch holes of the first and second link plates, means for limiting the separation of the first and second link plates to a predetermined maximum separation, the limiting means including a bifurcated clip spring selectively configured for placement about the connecting pins adjacent the outer face of one of the first and second link plates, the one master link plate including a pair of fastener receiving bores extending downwardly from the outer face thereof, fastener means selectively insertable into the fastener receiving bores for engaging the opposing arms of the bifurcated spring clip to prevent the transverse displacement and thereby the separation thereof and adapted to be maintained in the fastener receiving bores, and means for maintaining the fastener means at a position remote from the coupled roller link assemblies whereby the fastener means will not interfere with the free articulation thereof.

8 Claims, 7 Drawing Figures

PATENTED MAY 27 1975  3,885,445
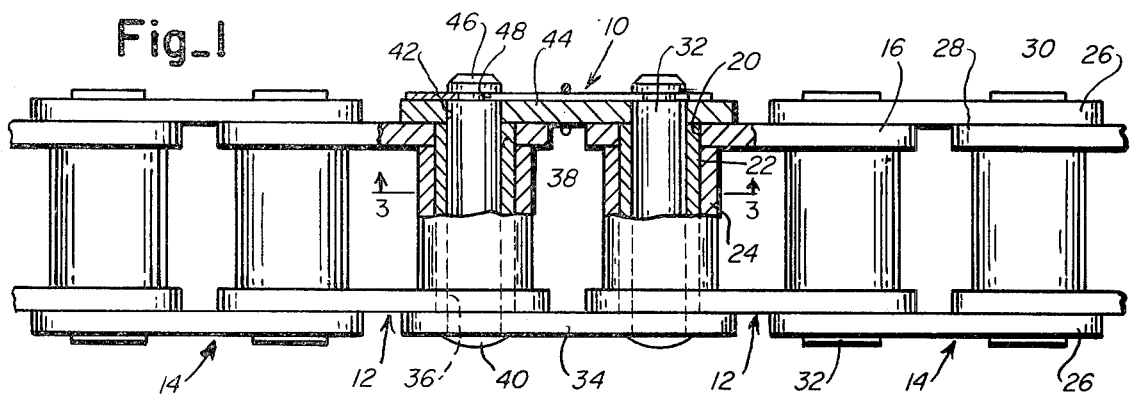
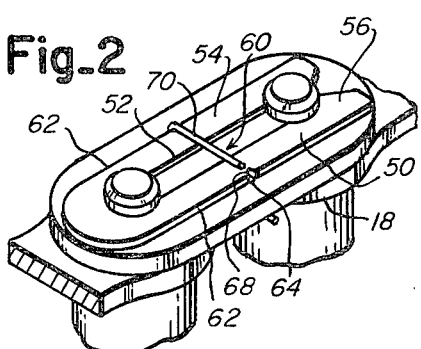
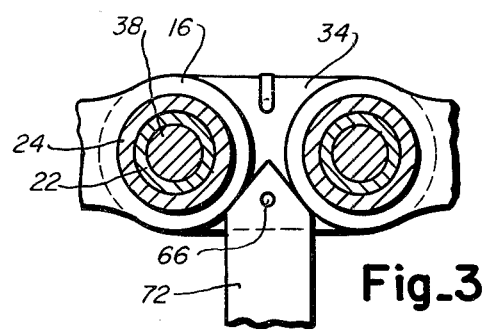
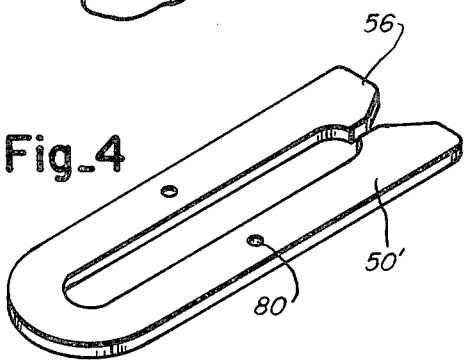
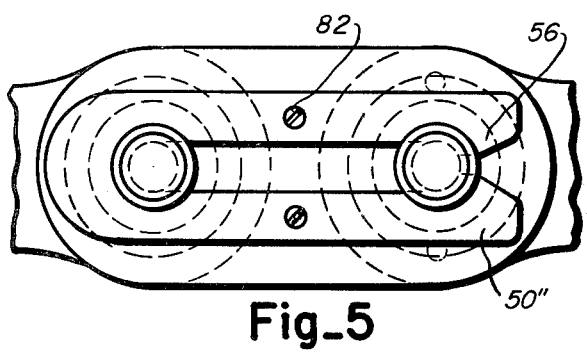
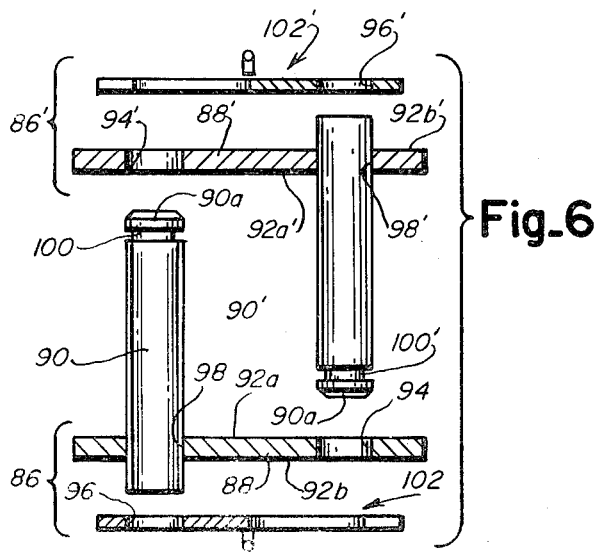
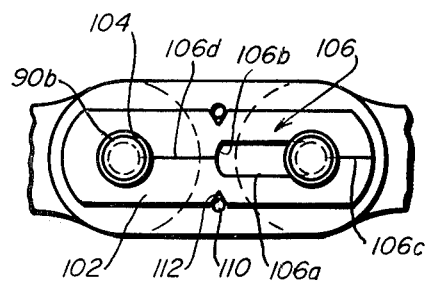

MASTER LINK ASSEMBLY

This invention relates to power transmission chain and, more particularly, to a master link assembly for releasably coupling opposing ends of a series of articulated links.

Master link assemblies are often subjected to extreme short duration forces and these forces may displace one of the connecting pins of such an assembly either axially or angularly with respect to the other connecting pin thereof and such relative displacement may result in the spring clip, which secures the master link assembly, being partially or completely disassociated from the connecting pins whereby the master link assembly will fail. Failure may also occur when a foreign object strikes the master link assembly.

While attempts have been made to prevent master link assembly failure either by bonding (with glue or the like) the spring clip in position or by wrapping wire or the like about the spring clip and its associated link plate and intertwisting the ends thereof, such attempts are not completely successful.

Applicant has discovered that the intertwisted loop interferes with the free articulation of the adjacent roller link assemblies and that such interference may result in failure of the intertwisted loop.

Accordingly, it is an object of the present invention to provide a master link assembly including a fastener for preventing not only the bowing out of the spring clip but all other distortions thereof which may result in the disassociation of the spring clip from the connecting pins.

Among the advantages of the present invention is the provision of a master link assembly including means for preventing the disassociation of the spring clip from the connecting pins wherein the free articulation of the coupled roller assemblies will not be interferred with.

Other objects and advantages of the present invention will become apparent from the following portion of this specification and from the accompanying drawings which illustrate, in accord with the mandates of the patent statutes presently preferred, embodiments incorporating the principles of the invention.

Referring to the drawings:

FIG. 1 is a plan view of a length of chain illustrating a fully assembled master link having a first preferred embodiment;

FIG. 2 is an oblique view of a portion of the chain illustrated in FIG. 1;

FIG. 3, is a side view of the chain illustrated in FIG. 1 taken along the lines 3—3 thereof with the fastener in the initial position and a tool being applied to bend the projecting ends thereof to lock the fastener in a final position;

FIG. 4 is an oblique view of a modified spring clip;

FIG. 5 is a side view of the master link assembly illustrating an alternate fastening structure;

FIG. 6 is a plan view in partial section of a master link assembly having a second preferred embodiment including two partially assembled identical half-link subassemblies; and FIG. 7 is an elevational view of a section of chain showing the master link assembly illustrated in FIG. 6 in assembled position prior to the attachment of the fastener.

Referring to FIGS. 1 and 2 of the drawings, a master link assembly 10 made in accordance with the teachings of the present invention and having a first preferred embodiment is illustrated. The master link 10 couples opposing ends of a series of articulated links made up of alternating roller link 12 and pin link 14 assemblies to define a link belt or chain.

Each roller link assembly 12 includes a pair of parallel link plates 16 which have circular end portions 18 for permitting articulation of the coupled links and which have a pair of pitch holes 20 extending between the opposing faces thereof. The roller link assembly additionally includes a pair of tubular bushings 22 which are press fitted into the pitch holes and optional rollers 24 which may be rotatably mounted on each of the bushings to minimize wear resulting from driving engagement with the teeth of a drive mechanism (not shown).

Each pin link assembly 14 includes a pair of parallel link plates 26 which have circular end portions 28 for permitting articulation of the coupled links and which have a pair of pitch holes 30 extending between the opposing faces thereof. The pin link assembly also includes a pair of cylindrical connecting rods 32 which are selectively sized for slidable insertion into the roller assembly tubular bushings and which are either drive (press) or slip fitted into the pitch holes of the pin link assembly link plates.

The master link assembly 10 includes a first link plate 34 having a pair of pitch holes 36 defined therein, which extend from the inner face to the outer face thereof, into which a pair of cylindrical connection pins 38 can be inserted. The cylindrical connection pins each have a selectively sized head 40 at one end to prevent the complete passage of these pins through the first link plate. Each of the connection pins 38 has a diametral dimension selected to allow slidable passage thereof through a tubular bushing 22 of a terminal roller link assembly and then into press or slip fit relationship with the pitch bores 42 of the second master link assembly link plate 44. The connection pins have a length selected so that when the master link assembly is assembled each pin will have a free end portion 46 which projects beyond the second link plate 44 a predetermined distance and which includes an annular groove 48 substantially continuous with the outer face of the second link plate.

To prevent the unintentional disassembly of the master link, a detachable U-shaped split spring clip 50 which has an inner slot portion 52 defined between the resiliently displaceable arms 54 thereof is located to engage the grooved recesses 48 defined in the free ends of the connection pins to inhibit the separation of the opposing master link plates beyond a predetermined maximum separation. An inwardly projecting ridge 56 is defined on the free end of each of the retaining clip arms and these ridges securely locate the spring clip about the two projecting portions of the connection pins and inhibit lateral displacement thereof across the face of the adjacent master link plate.

A lockwire 60 is fed axially (with relation to the connection pins) past the outer sides 62 of the spring clip arms and through a pair of master link plate bores 64 which may be coined and which are sized to slidably receive the parallel legs 66 of the lockwire. These bores are located so that the lockwire legs will be adjacent the clip spring arms to prevent the transverse spreading thereof. The legs have a sufficient length so that after complete insertion a portion of each leg can be turned back against the interior surface of the link plate to lock the lockwire in position about the spring clip. The lockwire will be accordingly maintained at a location remote from the adjacent roller assembly link plates 16 whereby the lockwire will not interfere with the free articulation of these roller link assemblies.

Additionally, notches 68 which are substantially coaxial with the face plate lockwire receiving bores and which are sized to slidably receive the lockwire clip may be defined in the sides 62 of the spring clip arms. When the lockwire is fixedly secured to the face plate a portion thereof will accordingly occupy these notches thereby preventing the lateral displacement of the clip ring across the face of the link plate. Since the top 70 of the lockwire abuts against the top face of the clip spring the bowing out thereof will be prevented.

A specially designed tool for locking the lockwire in the manner above discussed is illustrated in FIG. 3. The tool 72 is made from a rectangular rod of metal which has a hole defined therein proximate one end thereof to slidably receive one of the lockwire legs. This end is tapered so that the tool will be substantially slidably displaceable past the circular end portions 18 of the adjacent link plates into engagement with the master link plate 34. The tool is accordingly prevented from rotating about the lockwire leg and rotative displacement of the tool about the link plate will bring the projecting lockwire arm into locking engagement with the underside of the master link plate 34. Once the other free end of the lockwire is similarly bent, the lockwire will be in its locked position where it will not interfere with the free articulation of the adjacent roller link assemblies.

The lockwire can be fed in a manner such as disclosed in FIGS. 1 and 2 or may be fed from between the opposing master link plates. Additionally, the lockwire can be replaced by any wire which may either be bent or locked in the manner disclosed or intertwisted to secure it tightly in place.

Additionally, fastener receiving bores 80, coaxial with link plate fastener receiving bores 42 and sized to slidably receive the lockwire legs may be defined in the spring clip 54 (FIG. 4).

Additionally, rivets may be utilized or the fastener receiving holes may be tapped and screws 82 may be utilized as the fasteners (FIG. 5).

The master link assembly having the second preferred embodiment has two identical half-link sub-assemblies 86–86', only one of which will be described in detail; however, it will be understood that corresponding parts of the second sub-assembly are marked with the same reference numerals but are followed by a prime mark. Each sub-assembly has a link plate 88 having a connecting pin 90 projecting laterally from both inner 92a and outer 92b surfaces of plate 88 near one end thereof. Link plate 88 is also formed with an aperture 94 therein at the other end of the plate and which aperture is spaced from the pin. The connecting pin 90 may be made as a separate piece and press-fitted into an aperture 96 formed in the link plate. Aperture 94 has a slightly larger diameter than aperture 98 so as to thereby facilitate assembling and disassembling two identical half-link sub-assemblies, as will hereinafter be described.

A circumferential groove 100 is formed proximate an end 90a of the connecting pin furthest from the link plate, while the other end 90b is made in the form of a smooth shaft. When the connecting pin and link plate are assembled together the end 90b of the pin 90 extends only a short distance laterally beyond outside surface 92b of the link plate 92; while the other end 90a thereof extends a somewhat greater distance beyond inside surface 90a of the link plate. The connecting pin 90 is dimensioned so that when two identical sub-assemblies 86 are assembled together, the groove 100 will be immediately adjacent the outside surface 90b', of the cooperating sub-assembly. A spring clip retaining means 102 is securely coupled to the end 90b of the connecting pin adjacent the outside surface 90b of the link plate.

The spring clip 102 is generally made of spring metal and is formed with a circular aperture 104 near one end thereof which is sized to closely fit over the end 90b of the pin. Thus, the spring clip is permanently attached to the connecting pin by having the end 90b of the pin 90 extend through the aperture 104 to be thereafter headed or upset by swaging or by spin riveting. Proximate the other end of spring clip 102 there is formed a slot 106 having straight sides 106a, which are parallel to the longitudinal center line of the clip, and arcuate ends 106b. At the extreme end of clip where the slot is formed, the clip is split at 106c along its longitudinal center line such that two spring legs 106a are formed. The spring legs are designed to be snapped over the head of and into the circumferential groove of the connecting pin of an identical sub-assembly. An additional split is found in the clip 102, at 106d, to facilitate the action of spring legs 106a. Clip 102 may, however, be formed without split 106d, if it is found that spring legs function properly without same.

When the two identical sub-assemblies 86, 86' are assembled together, as shown in FIG. 7, the sub-assemblies are secured in position by a first spring clip 102 being snapped onto pin 90' and into groove 100' and with a second clip 102' similarly coupled onto the end of pin 90. It will be recognized that each spring clip independently holds the assembled sub-assemblies together, and that both spring clips must be unsnapped from their respective grooves before the assembled sub-assemblies can be separated.

Each master link plate has fastener receiving bores 110 drilled therein and fastener receiving notches 112 are defined in the opposing side walls of each spring clip whereby a lockwire can be mounted to each link plate for maintaining the spring clips in operable engagement with the master link plates.

Having thus described my invention, what I claim is:

1. A master link assembly for releasably coupling the opposing ends of a series of articulated links to form a chain wherein the opposing ends are defined by a pair of roller link assemblies each having a pair of opposing link plates with pitch holes extending between the opposing faces thereof and a pair of tubular bushings press fitted thereinto comprising first and second link plates each including a pair of pitch holes extending between the opposing faces thereof, a pair of connecting pins selectively configured for slidable insertion into a tubular bushing and for insertion into the pitch holes of said first and second link plates, means for limiting the separation of said first and second link plates to a predetermined maximum separation, said limiting means including a bifurcated clip spring selectively configured for placement about said connecting pins adjacent the outer face of one of said first and second link plates comprising the master link plate, said one master link plate including a pair of fastener receiving bores extending downwardly from the outer surface therof, fastener means selectively insertable into said fastener receiving bores for extending about and against the opposing arms of said bifurcated spring clip to secure said arms against said pins and prevent the transverse displacement and thereby the separation thereof, means for maintaining said fastener means in said fastener receiving bores and for maintaining said fastener means at a position remote from the coupled roller link assemblies whereby said fastener means will not interfere with the free articulation thereof.

2. A master link assembly according to claim 1, wherein said fastener receiving bores extend between the opposing faces of said one master link plate and said fastener means comprises a lockwire having a selected length so that a portion of each of the legs thereof will project beyond one face of said one master link plate when said lockwire is inserted into said fastener receiving bores, said projecting portions comprising said maintaining means and being selectively bendable into engagement with the other face thereof so that said lockwire will engage said spring clip and will be remote from the coupled roller link assemblies.

3. A master link assembly according to claim 1 wherein said fastener receiving bores are tapped and said fastener means comprises a pair of screws.

4. A master link assembly according to claim 1, wherein said spring clip includes a pair of bores selectively sized to slidably receive said fastener means and selectively located to be coaxial with the fastener receiving bores in said one master link plate whereby the lateral displacement of said spring clip across the face of said one master link will be prevented.

5. A master link assembly according to claim 1 wherein said spring clip includes a pair of notches defined in the outer sides of the spring clip arms, said notches being selectively sized to slidably receive said fastener means and selectively located to be coaxial with the fastener receiving bores in said one master link plate whereby the lateral displacement of said spring clip across the face of said one master link will be prevented.

6. A master link assembly according to claim 2, wherein said fastener receiving bores are selectively located adjacent to the opposing sides of said bifurcated clip spring whereby the transverse displacement of said clip spring will be prevented and said fastener receiving bores are selectively located intermediate said connecting pins whereby said lockwire can be bent into engagement with said one master link plate with said lockwire remote from the coupled roller assemblies.

7. A master link assembly according to claim 1, wherein said master link includes a second bifurcated clip spring selectively configured for placement about said connecting pins adjacent the outer face of the other one of said first and second link plates.

8. A master link assembly according to claim 7, comprising two integral half-link assemblies, each including
a. one of said master link plates
b. one of said clip springs and
c. one of said connecting pins.

* * * * *